Feb. 7, 1967 W. C. MILLIGAN 3,302,934
APPARATUS FOR MAKING POROUS MATERIALS
Filed June 4, 1965
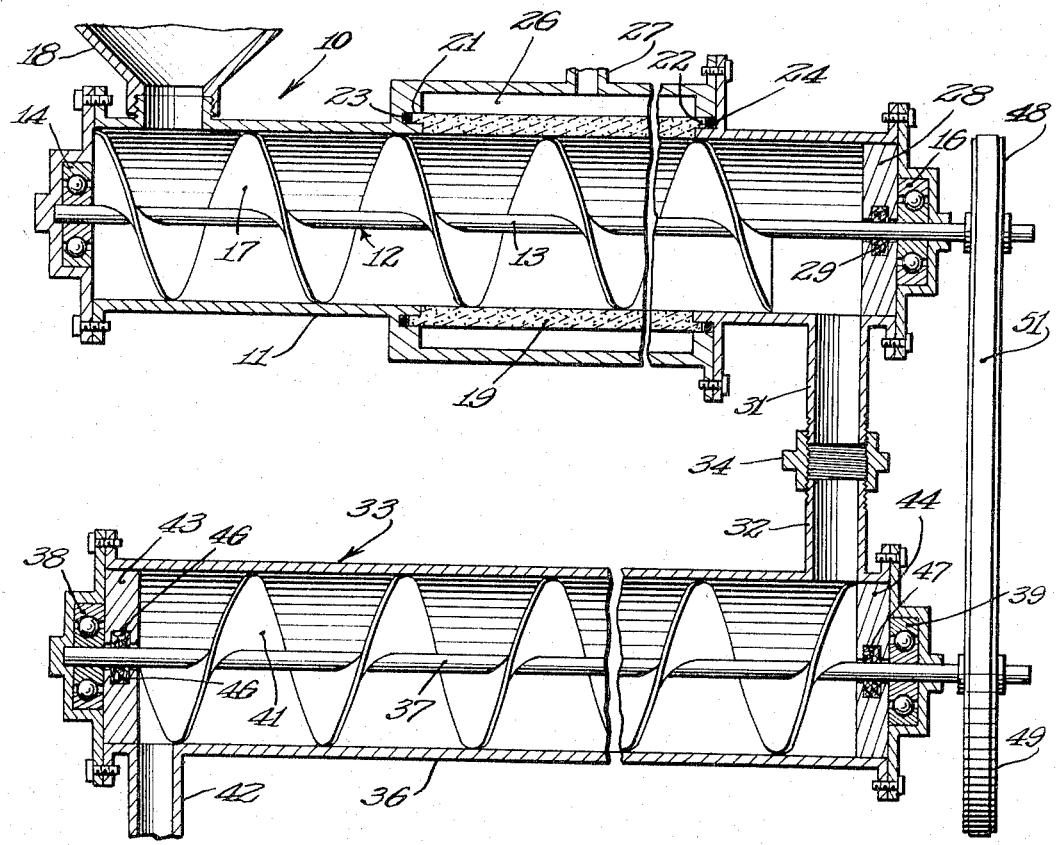
INVENTOR.
William C. Milligan 3,302,934
APPARATUS FOR MAKING POROUS MATERIALS
William C. Milligan, 1618 San Angelo Blvd.,
San Antonio, Tex. 78201
Filed June 4, 1965, Ser. No. 461,417
5 Claims. (Cl. 259—151)

The present invention relates to an apparatus for producing foamed materials where it is important to produce highly porous materials having very uniform cell sizes. The invention is particularly applicable to the manufacture of ceramic heating tile, and provides a method for introducing air or other foam inducing fluid into an aqueous slurry of the ceramic particles to provide a composition which can be fired into a tile of substantially uniformly small cell sizes.

In the past, numerous attempts have been made to provide an apparatus for the production of highly porous materials having very uniform cell sizes. Such apparatus, however, has had numerous disadvantages and design limitations which restricted its range of use, and which could not be used with widely varying materials, particularly granular materials. Such apparatus frequently had to employ high pressures and multiple extrusion ports in order to obtain uniform sized cells, together with violent agitation, or complicated mixing procedures.

One of the objects of the present invention is to provide an improved apparatus for injecting a foam promoting fluid into an aqueous slurry to produce a material of controlled porosity.

Another object of the invention is to provide an apparatus for producing foamed materials either continuously or in a batch type process, under conditions which permit close control over the size of the pores produced.

Another object of the invention is to provide a foaming apparatus which can be used with a wide range of gases or liquids as foaming agents.

Another object of the invention is to provide an apparatus which can be provided with accurate means for temperature control, as required, during operation.

The method of the present invention provides for moving an aqueous slurry containing inorganic particles, or the like, with a rotary tumbling motion and introducing a foam inducing fluid such as air into the slurry while the slurry is being so tumbled. In a preferred form of apparatus, the slurry is aerated as it is being tumbled by a screw type conveyor. As it is being propelled by the conveyor, it passes by a fluid permeable wall adjoining the screw conveyor, behind which there is a plenum chamber into which a foam producing fluid is introduced. The fluid passes through the permeable wall and is incorporated into the slurry while the same is being agitated. The aerated slurry is then preferably passed to a second screw conveyor for conditioning the same for various purposes, as will be apparent from a succeeding portion of the description.

A further description of the present invention will be made in conjunction with the attached sheet of drawings which illustrates the preferred embodiment thereof.

The single figure is a view in cross-section of a conveying and aerating means in accordance with the present invention.

As shown in the drawings:

In FIGURE 1, reference numeral 10 indicates generally an aerating device including a cylindrical housing 11 having a screw conveyor 12 disposed therein. The screw conveyor 12 consists of a shaft 13 mounted for rotation between a pair of bearings 14 and 16 and having screw flights 17 thereon. An inlet to the housing 11 is provided by a conically shaped hopper 18 at the inlet end of the conveyor. Centrally of the housing 11 there is provided a porous cylinder 19 which is permeable to the foam inducing fluid being used. As shown, the inner wall of the porous cylinder 19 is flush with the inner wall of the housing 11, and the cyinder 19 is provided with flange portions 21 and 22 on opposed ends thereof which bear against a pair of O rings 23 and 24 respectively thus preventing diffusion of the fluid from the sides of the cylinder 19. A plenum chamber 26 is disposed behind the porous cylinder 19, and is supplied with a fluid, such as air under pressure, through an inlet line 27.

The porous cylinder 19 is composed of a rigid but highly porous material such as a sintered powdered metal compact, or sintered ceramic particles having very fine passageways, usually measuring a few thousandths of an inch or less in diameter.

The aqueous slurry introduced onto the inlet end of the conveyor 12 is blended and tumbled substantially before it is mixed with the air or other foam inducing fluid being diffused through the porous cylinder 19. The slurry thereupon traps minute air bubbles, and the continued agitation of the mass after introduction of the air serves to distribute these air bubbles fairly uniformly throughout the entire mass. At the discharge end of the conveyor 12, the aerated material is pressed against a stuffing box 28 having a packing gland 29 disposed therein to prevent moisture penetration from reaching the bearing 16.

The discharge from the first conveyor 12 then moves by gravity through a discharge tube 31 and into an inlet tube 32 of a second screw conveyor generally indicated at reference numeral 33. The tubes 31 and 32 are connected by means of a coupling 34 which permits easy assembly and disassembly of the two conveyor units.

The second screw conveyor 33 includes a cylindrical housing 36 in which there is mounted a shaft 37 supported by means of opposed bearings 38 and 39. Screw flights 41 on the shaft 37 move the material from right to left as seen in the figure, to be discharged through a discharge opening 42. A pair of stuffing boxes 43 and 44 containing packing material 46 and 47 are provided at the ends of the screw conveyor to prevent moisture penetration from reaching the bearings 38 and 39.

At the extreme ends of the shafts 13 and 37 are a pair of pulleys 48 and 49 driven by a belt 51. In the particular embodiment of the invention illustrated in the drawings, the pulley 48 has a smaller diameter than the pulley 49 so that the rotational speed of the shaft 13 is somewhat higher than the rotational speed of the shaft 37. Actually, either shaft may be driven at any desired speed in relation to the other, but for most applications it is desired to rotate the shaft 13 about 20% to 50% faster than the shaft 37 in order to obtain a more thorough mixing in the first mixing chamber. In addition, the flights 17, if they have the same size and the same convolute shape as the flights 41 will tend to compress the mixture which has been formed under sufficient pressure to assure adequate and thorough mixing before the slurry is delivered to the second conveyor 33. This additional pressure is desirable so that any air bubbles which are introduced with the material at the inlet 18 will be thoroughly broken up and distributed into tiny gas bubbles comparable to those introduced through the porous cylinder 19.

As the slurry proceeds through the first conveyor stage, the wiping action of the material being tumbled and rotating around inside the cylinder as it moves axially along the cylinder results in a continuous shear action of the material to be foamed, distributing the introduced air into the aqueous slurry in a completely uniform manner. Normally, such small cellular pockets of gases or liquids are obtained in conventional apparatus only after extrusion through numerous small holes at the discharge end. The other technique employed for obtaining small cells and mechanical type foaming apparatus is by violent agitation. Such agitation cannot be used with granular materials without substantially breaking down the granular material, making it impossible to retain a desired granular size. Furthermore, granular materials cannot be used in the small hole extrusion system as they would clog up extrusion ports.

The number of individual cells resulting in the foamed mixture is controlled by both the feed rate of the first screw conveyor and the gas or liquid pressure existing in the plenum chamber 26. When larger size cells are desired, the feed rate is slower or the pressure in the chamber 26 is higher, or both factors are varied simultaneously.

The gas introduced into the plenum chamber 26 may be any suitable gas such as air, oxygen, hydrogen, helium, nitrogen, argon, or the like.

In addition to the gaseous foaming agents, various types of liquids may also be used as foam inducing materials. For example, expansible liquids such as hydrocarbons can be used to cause individual cellular expansion when heated or when suddenly allowed to expand at a lower pressure than that which exists in the foaming apparatus. Since the material is being introduced as a large number of tiny streams of fluid, no large intermittent slugs of gases or liquids are formed. Also, due to the direction of flow of the gases or liquids through the porous cylinder 19, the cylinder is self-cleaning and non-clogging.

It is also possible to operate the second screw conveyor in the reverse direction, that is, opposing the entrance of foamed materials from the first screw conveyor just enough to exert maximum back pressure and mixing effects, if desired, without actually stopping the input of material from the first screw conveyor. Conversely, the second screw conveyor shaft 37 can be rotated at a speed higher than the rotational speed of the shaft 13 if it is desired to move a relatively large mass of foamed material at a relatively high rate of production. This is sometimes desirable because the material put into the first screw conveyor may be thick and unaerated, but after passing through the foaming chamber, the slurry gains many times its volume under conditions of maximum aeration. Consequently, the provision of the second screw conveyor system adds a great deal of flexibility to the overall operation of the system, and makes it possible to use the system with a wide range of materials.

Either or both of the cylinders 11 and 36 may be heated, for example, by wrapping an electrical heating element about either cylinder.

From the foregoing, it will be understood that the device of the present invention provides a convenient means for intermittently or continuously introducing a foam inducing fluid into a travelling slurry. The apparatus is completely flexible, making it adaptable to use with various types of slurries, and under widely varying process conditions. Furthermore, the assembly is such that it can be readily disassembled for cleaning purposes when required.

It should also be evident that various modifications can be made to the described embodiment without departing from the scope of the present invention.

I claim as my invention:

1. An aerating device for slurries comprising a first screw conveyor, means for introducing a slurry into said screw conveyor, plenum chamber defining means disposed coaxially with said first screw conveyor, said means including a fluid permeable wall adjoining said first screw conveyor, means for introducing a foam producing fluid through said permeable wall and into the slurry being conveyed by said first conveyor means, a second conveyor means receiving the discharge from said first screw conveyor, and means for driving said first and second conveyor means at differing speeds.

2. An aerating device for slurries comprising a first screw conveyor, means for introducing a slurry into said screw conveyor, plenum chamber defining means disposed coaxially with said first screw conveyor, said means including a fluid permeable wall adjoining said first screw conveyor, means for introducing a foam producing fluid through said permeable wall and into the slurry being conveyed by said first conveyor means, a second screw conveyor in spaced relation to said first screw conveyor, and gravity feed means directing the discharge from said first screw conveyor onto said second screw conveyor.

3. An aerating device for slurries comprising a first screw conveyor, a housing supporting said first screw conveyor for rotation therein, a portion of said housing having a fluid permeable wall therein, means for directing a foam inducing gas through said wall and into the slurry being moved by said screw conveyor, and a second conveyor having an inlet end communicating with the discharge end of said first conveyor, and means for jointly rotating both said screw conveyors.

4. The device of claim 3 in which said fluid permeable wall is composed of a gas permeable sintered powdered metal.

5. The device of claim 3 in which said fluid permeable wall is composed of a gas permeable sintered powdered ceramic material.

References Cited by the Examiner
UNITED STATES PATENTS

| | | | |
|---|---|---|---|
| 778,558 | 12/1904 | Truxal | 259—69 |
| 1,769,309 | 7/1930 | Rice et al. | 259—151 |
| 2,942,860 | 6/1960 | Ridley et al. | 259—151 |
| 3,026,094 | 3/1962 | True | 259—151 |
| 3,137,482 | 6/1964 | Hackley | 259—151 |

WALTER A. SCHEEL, *Primary Examiner.*

R. W. JENKINS, *Assistant Examiner.*